United States Patent
Park et al.

(10) Patent No.: US 7,432,894 B2
(45) Date of Patent: Oct. 7, 2008

(54) LIQUID CRYSTAL DISPLAY DEVICE AND METHOD OF DRIVING THE SAME

(75) Inventors: Hyong-Yerl Park, Gyoungsangbuk-Do (KR); Gil-Jun Han, Gyoungsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 320 days.

(21) Appl. No.: 10/668,606

(22) Filed: Sep. 24, 2003

(65) Prior Publication Data

US 2004/0125060 A1 Jul. 1, 2004

(30) Foreign Application Priority Data

Dec. 31, 2002 (KR) ...................... 10-2002-0088475

(51) Int. Cl.
*G09G 3/36* (2006.01)
(52) U.S. Cl. .............................. 345/87; 345/89; 345/92; 345/100; 345/103
(58) Field of Classification Search ............. 345/87–98, 345/126, 100, 121, 1.3, 103, 1.1, 2.1, 204; 349/149, 150, 58, 61, 64; 362/27, 29, 30, 362/561; 257/80, 1.3
See application file for complete search history.

(56) References Cited

U.S. PATENT DOCUMENTS

| | | | | | |
|---|---|---|---|---|---|
| 5,966,115 | A | * | 10/1999 | Aoki | .......................... 345/204 |
| 6,262,702 | B1 | * | 7/2001 | Murade | ....................... 345/87 |
| 6,483,493 | B2 | * | 11/2002 | Murade | ....................... 345/87 |
| 6,839,046 | B1 | * | 1/2005 | Orisaka et al. | ................ 345/98 |
| 7,145,539 | B2 | * | 12/2006 | Lim | ............................. 345/98 |
| 7,271,787 | B2 | * | 9/2007 | Kim et al. | ..................... 345/87 |
| 2001/0022572 | A1 | * | 9/2001 | Murade | ....................... 345/98 |
| 2002/0039089 | A1 | * | 4/2002 | Lim | ............................. 345/87 |
| 2002/0176044 | A1 | * | 11/2002 | Lim | ........................... 349/149 |
| 2003/0117359 | A1 | * | 6/2003 | Park | ............................. 345/90 |
| 2004/0125070 | A1 | * | 7/2004 | Kim et al. | ................... 345/100 |
| 2004/0183957 | A1 | * | 9/2004 | Han | ............................. 349/58 |
| 2004/0257493 | A1 | * | 12/2004 | Lim | ............................. 349/64 |
| 2004/0262623 | A1 | * | 12/2004 | You | ............................. 257/80 |
| 2004/0263758 | A1 | * | 12/2004 | Lee et al. | ..................... 349/150 |
| 2004/0264212 | A1 | * | 12/2004 | Chung et al. | ................. 362/561 |
| 2005/0062698 | A1 | * | 3/2005 | Hong | ........................... 345/87 |
| 2005/0088584 | A1 | * | 4/2005 | Moon | .......................... 349/61 |
| 2005/0088602 | A1 | * | 4/2005 | Park et al. | .................... 349/149 |
| 2005/0110733 | A1 | * | 5/2005 | Sasaki et al. | .................. 345/87 |
| 2005/0110921 | A1 | * | 5/2005 | Jeon | ............................. 349/64 |

(Continued)

*Primary Examiner*—Prabodh Dharia
(74) *Attorney, Agent, or Firm*—McKenna Long & Aldridge LLP

(57) ABSTRACT

A liquid crystal display device includes an image display part formed on a first substrate a plurality of gate tape carrier packages having a gate driving integrated circuit for driving gate lines, a plurality of data tape carrier packages having a data driving integrated circuit for driving the data lines, a first control signal line formed together with conductive lines to supply a first control signal to the gate driving integrated circuits to sequentially drive the gate lines of the image display part, a second control signal line formed together with the conductive lines to supply a second control signal to the gate driving integrated circuits to sequentially drive the gate lines of the image display part, and a first controller for supplying the first and second control signals to the first and second control signal lines.

11 Claims, 6 Drawing Sheets

U.S. PATENT DOCUMENTS

| | | | |
|---|---|---|---|
| 2005/0122707 A1* | 6/2005 | Kim | 362/29 |
| 2005/0140847 A1* | 6/2005 | Jeon | 349/62 |
| 2005/0146650 A1* | 7/2005 | Chung et al. | 349/58 |
| 2005/0270266 A1* | 12/2005 | Lin et al. | 345/103 |
| 2007/0146251 A1* | 6/2007 | Tsuge et al. | 345/76 |

* cited by examiner

UP/DOWN1=HIGH,LEFT/RIGHT1=LOW

UP/DOWN1=HIGH,LEFT/RIGHT1=HIGH

UP/DOWN1=LOW,LEFT/RIGHT1=LOW

LIQUID CRYSTAL DISPLAY DEVICE AND METHOD OF DRIVING THE SAME

The present invention claims the benefit of Korean Patent Application No. P2002-088475 filed in Korea on Dec. 31, 2002, which is hereby incorporated by reference.

BACKGROUND OF THE INVENTION

1. Field of the Invention

The present invention relates to a display device and, more particularly to a liquid crystal display device and a method of driving a liquid crystal display device.

2. Discussion of the Related Art

In general, a liquid crystal display device displays images by individually supplying data signals to liquid crystal cells arranged in a matrix configuration and controlling light transmittance of the liquid crystal cells. Accordingly, the liquid crystal display device includes a liquid crystal display panel with the liquid crystal cells by the unit of a pixel arranged in the matrix configuration and a driving circuit for driving the liquid crystal cells.

The liquid crystal display panel includes a color filter substrate and a thin film transistor array substrate attached together with a certain gap therebetween, and a liquid crystal material layer formed in the gap between the color filter substrate and the thin film transistor array substrate. On the thin film transistor array substrate of the liquid crystal display panel, a plurality of data lines transmitting image information to the liquid crystal cells and a plurality of gate lines transmitting a scan signal to the liquid crystal cells intersect, and liquid crystal cells are defined at every intersection of the data lines and gate lines. A common electrode and a pixel electrode are formed at each of facing inner surfaces of the color filter substrate and the thin film transistor array substrate to supply an electric field to the liquid crystal layer. The pixel electrode is formed at every liquid crystal cell of the thin film transistor array substrate, while the common electrode is integrally formed along an entire surface of the color filter substrate. Accordingly, by controlling voltages supplied to the pixel electrode when the common electrode receives a voltage, light transmittance of liquid crystal cells may be individually controlled.

In order to control the voltage supplied to the pixel electrode by liquid crystal cells, each liquid crystal cell includes a thin film transistor applied as a switching device. The driving circuit includes a gate driving unit supplying a scan signal to the gate lines, a data driving unit supplying image information to the data lines, a timing controller controlling a driving timing of the gate driving unit and the data driving unit, and a power supply unit supplying various driving voltages used for a liquid crystal display device.

The timing controller controls a driving timing of the gate driving unit and the data driving unit through image information and a control signal supplied from an external graphic processor. The timing controller also supplies image information to the data driving unit.

The power supply unit generates driving voltages, such as a common voltage (Vcom), a gate high voltage (Vgh), a gate low voltage (Vgl) or a gamma reference voltage (Vref) used for the liquid crystal display device by using power supplied from the external graphic processor. The power supply unit supplies the driving voltages to the gate driving unit, the data driving unit, a gamma voltage generator, and the liquid crystal display panel.

The gate driving unit sequentially supplies scan signals to the gate lines so that the liquid crystal cells arranged in the matrix configuration can be selected line-by-line, and image information is supplied to the liquid crystal cells of the selected one line from the data driving unit by way of the data lines.

When the image information is individually supplied to the pixel electrode of the liquid crystal cells and the common voltage (Vcom) is supplied to the common electrode, a voltage difference occurs between the pixel electrode and the common electrode, according to which an electric field is supplied to the liquid crystal material layer. Thus, light transmittance of the liquid crystal cells are individually controlled to display a desired image.

The data driving unit and the gate driving unit, which are directly connected to the liquid crystal display panel, are integrated with a plurality of integrated circuits (IC). The data driving ICs and the gate driving ICs are respectively mounted on a tape carrier package (TCP) and connected to the liquid crystal display panel in a tape automated bonding (TAB) method, or the data driving ICs and the gate driving ICs are respectively mounted on the liquid crystal display panel in a chip on glass (COG) method.

The data driving ICs and gate driving ICs mounted on the TCP and connected to the liquid crystal display panel in the TAB method receive control signals and DC voltages input from outside through signal lines mounted on a printed circuit board (PCB) connected to the TCP and are connected to each other. That is, the data driving ICs are connected in series to each other through the signal lines mounted on the data PCB and receive image information, control signals and drive voltages applied from the timing controller and the power supply unit.

The gate driving ICs are connected in series to each other through signal lines mounted on the gate PCB and receive control signals and driving voltages supplied from the timing controller and the power supply unit.

FIG. 1 is a schematic plan view of a liquid crystal display device according to the related art. In FIG. 1, a liquid crystal display device includes a liquid crystal display panel 1, a plurality of data TCPs 8 connected between one longer side of the liquid crystal display panel 1 and a data PCB 12, a plurality of gate TCPs 14 connected between one shorter side of the liquid crystal display panel 1 and a gate PCB 13, data driving ICs 10 respectively mounted at the data TCPs 8, and gate driving ICs 16 respectively mounted at the gate TCPs 14.

The liquid crystal display panel 1 is formed as a thin film transistor (TFT) array substrate 2 and a color filter (CF) substrate 4 attached together and facing each other with a certain gap therebetween, and a liquid crystal material layer (not shown) is formed in the gap.

The one shorter side and one longer side of the TFT array substrate 2 protrudes compared with the CF substrate 4, and a gate pad part and a data pad part are provided at the protruded region of the TFT array substrate 2. At the region where the TFT array substrate 2 and the CF substrate 4 are attached together, an image display part 21 is formed on which pixels are arranged in a matrix configuration. At the image display part 21 of the TFT array substrate 2, a plurality of gate lines 20 are arranged horizontally and connected to the gate pad part, and a plurality of data lines 18 are arranged vertically and connected to the data pad part. Accordingly, the gate lines 20 and the data lines 18 intersect, and pixels having a TFT and a pixel electrode are individually provided at the intersection and arranged in a matrix form.

At the image display part 21 of the CF substrate 4, there are provided red, green, and blue color filters coated by a black matrix, and a common electrode forming an electric field at the liquid crystal material layer together with the pixel electrode provided at the TFT array substrate 2.

An input pad 24 and an output pad 25 electrically connected to the data driving ICs 10 are formed at the data TCPs 8. The input pad 24 of the data TCPs 8 is electrically connected to the data PCB 12, and the output pad 25 of the data TCPs 8 is electrically connected to the data pad part of the thin film transistor array substrate 2. The data driving ICs 10 convert digital signals into analog signals and supply them to the data lines 18 of the liquid crystal display panel 1.

An input pad 28 and an output pad 29 electrically connected to the gate driving ICs 16 are formed at the gate TCPs 14. The input pad 28 of the gate TCPs 14 is electrically connected to the gate PCB 13, while the output pad 29 of the gate TCPs 14 is electrically connected to the gate pad part of the thin film transistor array substrate 2.

The gate driving ICs 16 sequentially supply the scan signal to the gate lines 20 of the liquid crystal display panel 1. The data PCB 12 and the gate PCB 13 respectively include connectors 55 and 65 to receive control signals and driving voltages through a flexible plate cable (FPC) 70 from outside.

In general, the liquid crystal display device shows changed picture quality characteristics depending on a main viewing angle at which a viewer views a screen. For example, for a liquid crystal display device applied to a notebook computer, its main viewing angle is determined by a direction that a viewer views a screen from an upper side as much as a predetermined angle on the basis of a direction vertical to the screen. When a liquid crystal display panel is installed with a certain height at a public place or a public traffic means (i.e., bus, train, or airplane), its main viewing angle is determined by a direction that a viewer views a screen from a lower side as much as a certain angle on the basis of a direction vertical to a screen.

Meanwhile, when a liquid crystal display device is applied to an audio/visual system or various information displays installed between a driver's seat and a passenger's seat, its main viewing angle is determined by a direction that a viewer views a screen from a left side or a right side as much as a certain angle on the basis of a direction vertical to the screen. Accordingly, the liquid crystal display device is fabricated such that an image is horizontally and vertically reversed according to a usage environment.

In order to reverse an image of the liquid crystal display device vertically or horizontally, the liquid crystal display device includes a first controller 51 provided at the gate PCB 13, which applyies a first control signal (UP/DOWN) to the gate driving ICs 16 through the gate TCPs 14 to vertically reverse an image displayed on the image display part 21 of the liquid crystal display panel 1, and a second controller 52 provided at the data PCB 12, which applyies a second control signal (LEFT/RIGHT1) to the data driving ICs 10 through the data TCPs 8 to horizontally reverse an image displayed on the image display part 21 of the liquid crystal display panel 1.

FIGS. 2A to 2C are schematic diagrams showing normal, reversed, and inverted images as displayed on an image display part of a liquid crystal display panel according to the related art. First, with reference to FIG. 2A, when the first control signal (UP/DOWN1) with a high potential is supplied to the gate driving ICs 16 through the gate TCPs 14 and the second control signal (LEFT/RIGHT1) with a low potential is supplied to the data driving ICs 10 through the data TCPs 8, gate lines 18 provided at the image display part 21 are sequentially driven from the first one to the last one. Image information is thus applied by the unit of the gate line from the left side to the right side from the data driving ICs 10 through the data TCPs 8, whereby an image is normally displayed on the image display part 21.

With reference to FIG. 2B, when the first control signal (UP/DOWN1) with a high potential is supplied to the gate driving ICs 16 through the gate TCPs 14 and the second control signal (LEFT/RIGHT1) with a high potential is applied to the data driving ICs 10 through the data TCPs 8, the gate lines 18 provided at the image display part 21 are sequentially driven from the first one to the last one. Image information is thus supplied from the right side to the left side from the data driving ICs 10 through the data TCPs 8, whereby an image is reversed and displayed on the image display part 21. 10025With reference to FIG. 2C, when the first control signal (UP/DOWN1) with a low potential is supplied to the gate driving ICs 16 through the gate TCPs 14 and the second control signal (LEFT/RIGHT1) with a low potential is supplied to the data driving ICs 10 through the data TCPs 8, the gate lines 18 provided at the image display part 21 are sequentially driven from the last one to the first one. Thus, image information is supplied from the left side to the right side from the data driving ICs 10 through the data TCPs 8, whereby an image is inverted and displayed on the image display part 21.

However, because the connectors 55 and 65 are respectively formed at the data PCB 12 and the gate PCB 13 and control signals and driving voltages are received through the FPC 70 from outside, the liquid crystal display device has the following problems. First, as the connectors 55 and 65 are respectively formed on the thin data PCB 12 and the thin gate PCB 13, the thickness of the liquid crystal display device is inevitably increased as high as the connectors 55 and 65, which makes it difficult to obtain a thin liquid crystal display device.

Second, because the FPC 70 needs to be installed to electrically connect the connectors 55 and 65, the number of processes for fabrication of a liquid crystal display device increases a unit cost of the liquid crystal display device also increases.

In order to avoid such problems, there has been proposed a technique to mount lines supplying control signals and drive voltages to the data PCB 12 and the gate PCB 13 are mounted at an outer dummy region of the thin film transistor array substrate 2 so that either the data PCB 12 or the gate PCB 13 can be removed. Accordingly, since the gate driving IC 16 needs fewer signals than the data driving IC 10, the gate PCB 13 is commonly removed.

In other words, the gate driving ICs 16 connected to the liquid crystal display panel 1 by the TAB method receive control signals and DC voltages from the data PCB 12 through line-on-glass (LOG) lines mounted on the thin film transistor array substrate 2 of the liquid crystal display panel 1, and are connected to each other.

FIG. 3 is a schematic plan view of a liquid crystal display device without a gate PCB according to the related art. In FIG. 3, a liquid crystal display device includes a liquid crystal display panel 101, a plurality of data TCPs 108 connected between one longer side of the liquid crystal display panel 101 and a data PCB 112, a plurality of gate TCPs 114 connected to one shorter side of the liquid crystal display panel 101, data driving ICs 110 mounted at each of the data TCPs 108, and gate driving ICs 116 mounted at each of the gate TCPs 114.

The liquid crystal display panel 101 is formed as a TFT array substrate 102 and a CF substrate 104 are attached together and face each other with a certain gap therebetween, and a liquid crystal material layer (not shown) is formed in the gap. The one shorter side and one longer side of the TFT array substrate 102 protrudes as compared with the CF substrate 104, and a gate pad part and a data pad part are provided at the protruded region of the TFT array substrate 102.

At the region where the TFT array substrate 102 and the CF substrate 104 are attached together, an image display part 121 is formed on which pixels are arranged in a matrix form. At the image display part 121 of the TFT array substrate 102, a plurality of gate lines 120 are arranged horizontally and connected to the gate pad part, and a plurality of data lines 118 are arranged vertically and connected to the data pad part. Accordingly, the gate lines 120 and the data lines 118 intersect, and pixels having a TFT and a pixel electrode are individually provided at the intersection and arranged in a matrix form.

At the image display part 121 of the CF substrate 104, there are provided red, green, and blue color filters coated by a black matrix, and a common electrode forming an electric field at the liquid crystal layer together with a pixel electrode provided at the TFT array substrate 102. The gate pad part and the data pad part provided at the protruded region of the TFT array substrate 102 are formed to correspond to the image display part 121. Thus, the corner portion where one shorter side and one longer side of the TFT array substrate 102 meet is a dummy region that is not used. But recently, LOG lines 126 are formed at the corner portion to supply control signals and driving voltages to the gate driving ICs 116.

Input pads 124 and output pads 125 electrically connected to the data driving IC 110 are formed at the data TCP 108. The input pads 124 of the data TCP 108 are electrically connected to the data PCB 112, and the output pads 125 of the data TCP 108 are electrically connected to the data pad part of the TFT array substrate 102.

A first data TCP 108 includes a gate signal transmission line 122 electrically connected to the LOG lines 126 mounted at the TFT array substrate 102. The gate signal transmission line 122 transmits gate control signals and gate driving voltages supplied from a timing controller and a power supply unit via the data PCB 112 to the LOG lines 126.

The data driving ICs 110 convert digital signals into analog signals and supply them to the data lines 118 of the liquid crystal display panel 101. At the gate TCP 114, gate driving ICs 116 are mounted, and in addition, gate signal transmission lines 128 electrically connected to the gate driving ICs 116 and output pads 130 are formed.

The gate signal transmission lines 128 are electrically connected to the LOG lines 126 mounted on the TFT array substrate 102, and the output pads 130 are electrically connected to the gate pad part of the TFT array substrate 102. The gate driving ICs 116 sequentially supply a scan signal, such as a gate high voltage signal (Vgh) and a gate low voltage signal (Vgl), to the gate lines 120 in response to gate control signals and gate driving voltages applied through the LOG lines 126 and the gate signal transmission lines 128.

Each LOG line 126 supplies DC voltage signals, such as the gate high voltage signal (Vgh), the gate low voltage signal (Vgl), a common voltage signal (Vcom), a ground signal (GND), and a power supply voltage signal (Vdd), supplied from a power supply unit and gate control signals, such as a gate start pulse (GSP), a gate shift clock (GSC), and a gate enable signal (GOE), supplied from the timing controller. The LOG lines 126 are patterned at the same time as when the gate lines and the gate electrodes are formed on the thin film transistor array substrate 102.

However, the related art of the liquid crystal display device without the PCB has the following problem. By applying the gate start pulse (GSP) to the gate driving IC through the line-on-glass line, the gate lines of the image display part may be sequentially driven from the first one to the last one, but conversely, it is not possible to drive the gate lines of the image display part from the last one to the first one. Therefore, because the vertical reversing of an image is not possible, it is limited to a usage environment.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device having images that can be inverted and reversed.

Another object of the present invention is to provide a method of driving a liquid crystal display device having images that can be inverted and reversed.

To achieve these and other advantages and in accordance with the purpose of the present invention, as embodied and broadly described herein, a liquid crystal display device includes an image display part formed on a first substrate where data lines and gate lines are vertically and horizontally arranged, respectively, to intersect each other, a plurality of gate tape carrier packages having a gate driving integrated circuit for driving the gate lines, a plurality of data tape carrier packages having a data driving integrated circuit for driving the data lines, a plurality of conductive lines formed at an outer side of the image display part of the first substrate for supplying gate driving signals to the gate driving integrated circuits, a first control signal line formed together with the conductive lines for supplying a first control signal to the gate driving integrated circuits so that the gate lines of the image display part may be sequentially driven from the first one to the last one, a second control signal line formed together with the conductive lines for supplying a second control signal to the gate driving integrated circuits so that the gate lines of the image display part may be sequentially driven from the last one to the first one, and a first controller for supplying the first and second control signals to the first and second control signal lines.

In another aspect, a method of driving a liquid crystal display device includes providing a plurality of gate tape carrier packages having a gate driving integrated circuit for driving a plurality of gate lines, providing a plurality of data tape carrier packages having a data driving integrated circuit for driving a plurality of data lines, providing a plurality of conductive lines at an outer side of an image display part of a first substrate for supplying gate driving signals to the gate driving integrated circuits, and supplying a first control signal to the gate driving integrated circuits using a first control line so that the gate lines of the image display part may be sequentially driven from the last one to the first one.

In another aspect, a method of driving a liquid crystal display device includes providing a liquid crystal display device including an image display part formed on a first substrate where data lines and gate lines are vertically and horizontally arranged, respectively, to intersect each other, a plurality of gate tape carrier packages having a gate driving integrated circuit for driving the gate lines, a plurality of data tape carrier packages having a data driving integrated circuit for driving the data lines, and a plurality of conductive lines mounted at an outer side of the image display part of the first substrate for supplying gate driving signals to the gate driving integrated circuits, and supplying a first control signal to the gate driving integrated circuits using a first control line so that the gate lines of the image display part may be sequentially driven from the last one to the first one.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
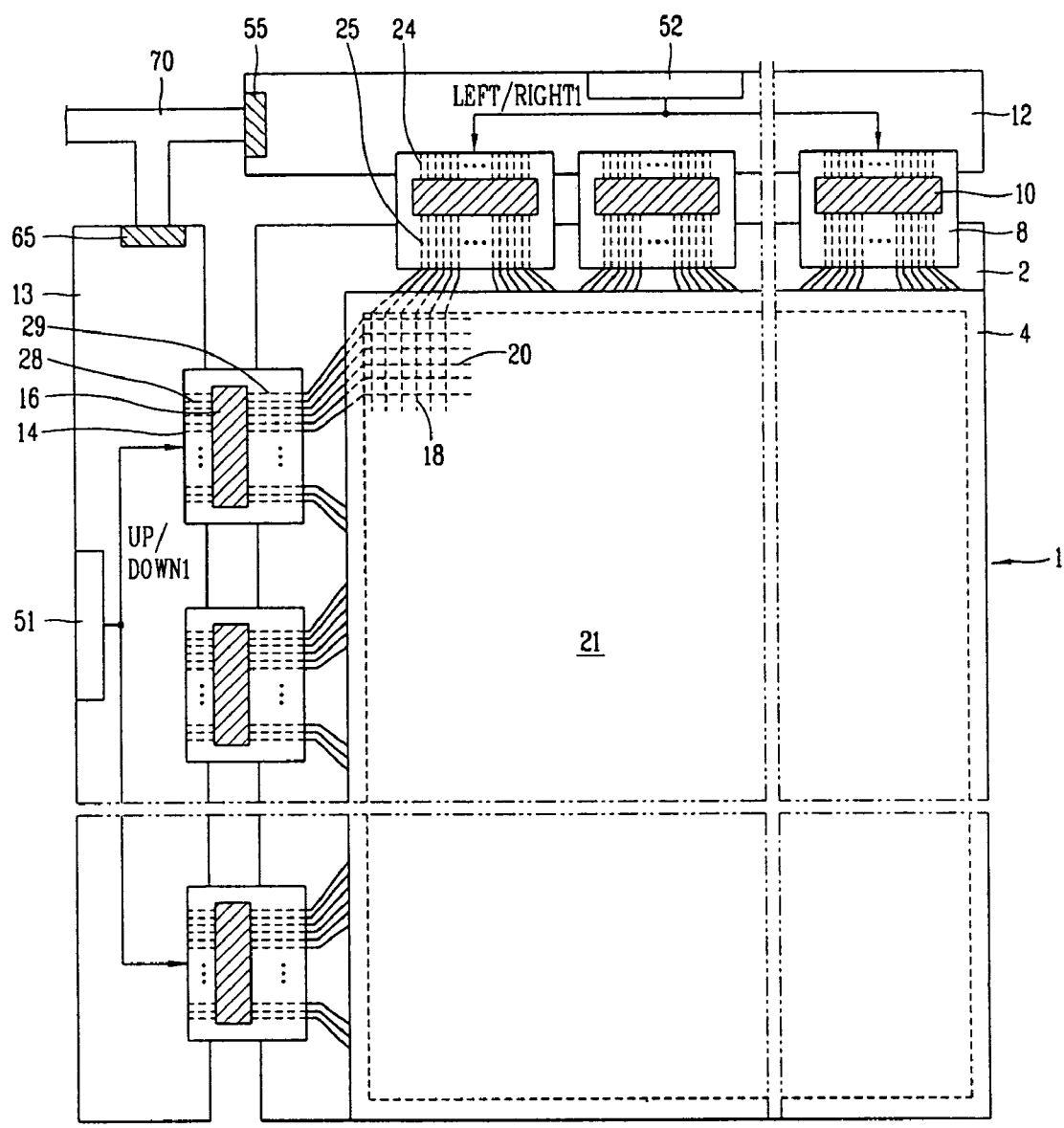
FIG. 1 is a schematic plan view of a liquid crystal display device according to the related art.
Figure 2A:
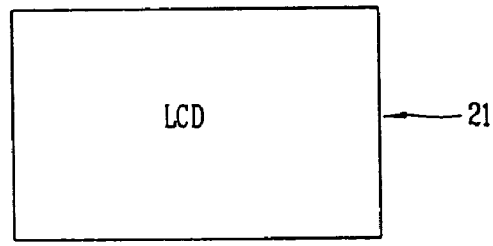
FIGS. 2A to 2C are schematic diagrams showing normal, reversed, and inverted images as displayed on an image display part of a liquid crystal display panel according to the related art.
Figure 2B:
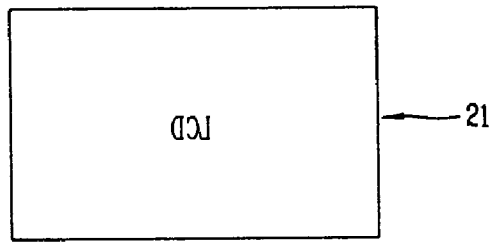
Figure 2C:
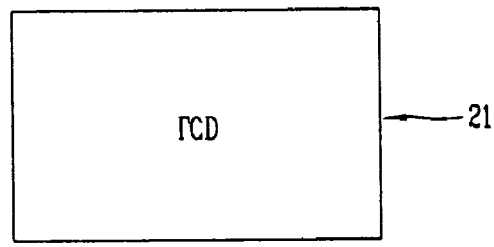
Figure 3:
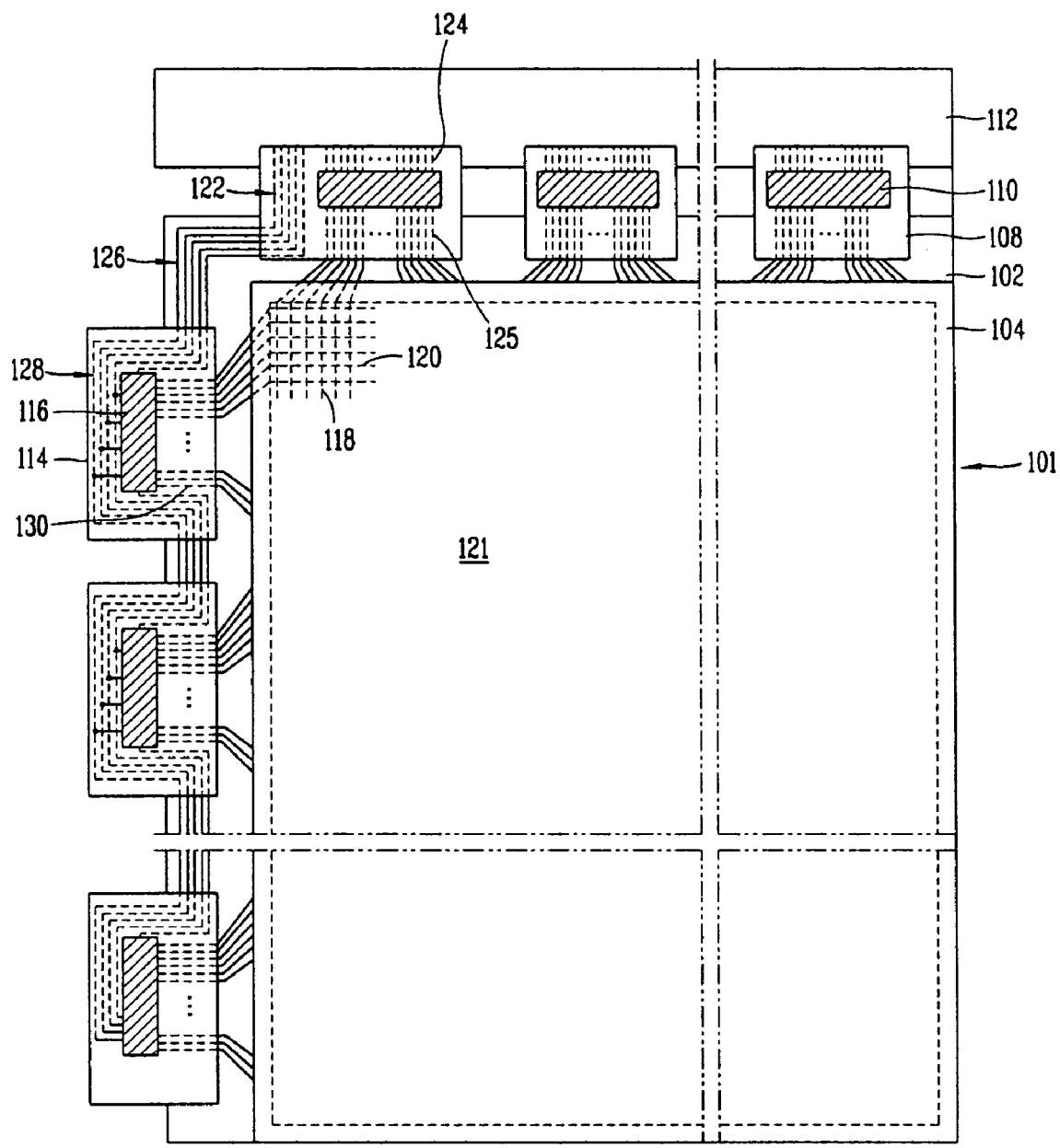
FIG. 3 is a schematic plan view of a liquid crystal display device without a gate PCB according to the related art.
Figure 4:
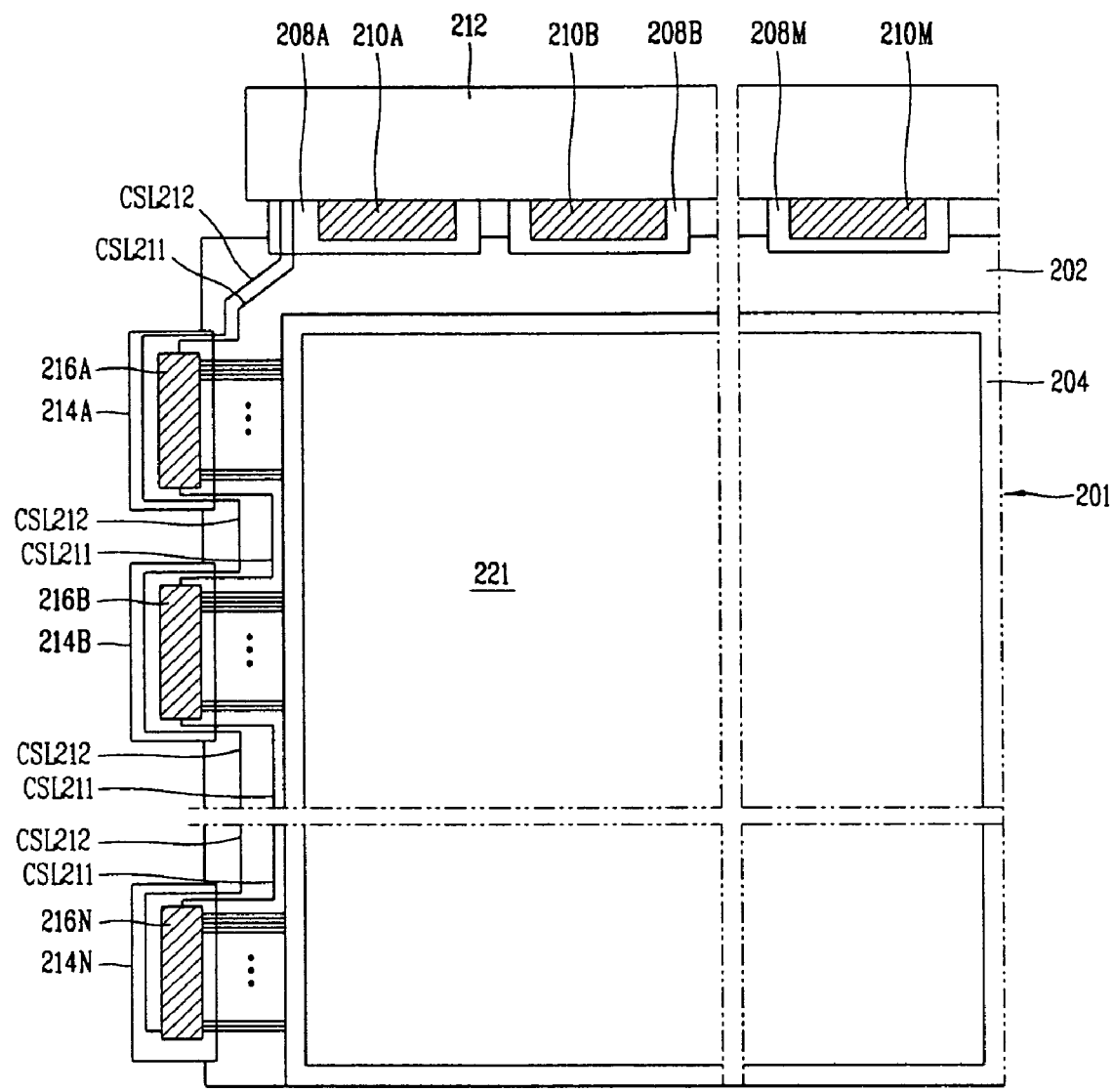
FIG. 4 is a schematic plan view of an exemplary liquid crystal display device according to the present invention.

FIG. 4 is a schematic plan view of an exemplary liquid crystal display device according to the present invention. In FIG. 4, a liquid crystal display device may include a liquid crystal display panel 201, first to M-th data TCPs 208A to 208M connected between one longer side of the liquid crystal display panel 201 and a data PCB 212, first to N-th gate TCPs 214A to 214N connected to one shorter side of the liquid crystal display panel 201, first to M-th data driving ICs 210A to 210M mounted at first to M-th data TCPs 208A to 208M, and first to N-th gate driving ICs 216A to 216N mounted at first to N-th gate TCPs 214A to 214N.

At an outer side of an image display part 221 of the liquid crystal display panel 201, first and second control signal lines CSL211 and CSL212 may be mounted to be respectively connected between the first data TCP 208A and first to N-th gate TCP 214A to 214N. In addition, a controller (not shown) may be provided in the data PCB 212 to supply first and second control signals to the first and second control signal lines CSL211 and CSL212.

The liquid crystal display panel 201 may be formed as a TFT array substrate 202 and a CF substrate 204 may be attached together and face each other with a certain gap therebetween, and a liquid crystal material layer (not shown) may be formed in the gap. The one shorter side and one longer side of the TFT array substrate 202 may protrude, as compared with the CF substrate 204, and a gate pad part and a data pad part may be provided at the protruding region of the TFT array substrate 202.

At the region where the TFT array substrate 202 and the CF substrate 204 are attached together, an image display part 221 may be formed upon which pixels may be arranged in a matrix configuration. At the image display part 221 of the TFT array substrate 202, a plurality of gate lines may be arranged horizontally and may be connected to the gate pad part, and a plurality of data lines may be arranged vertically and may be connected to the data pad part. Accordingly, the gate lines and the data lines intersect, and pixels having a TFT and a pixel electrode may be individually provided at the intersection and may be arranged in a matrix configuration. At the image display part 221 of the CF substrate 204, there are provided red, green, and blue color filters coated by a black matrix, and a common electrode forming an electric field at the liquid crystal material layer together with a pixel electrode provided at the TFT array substrate 202.

The gate pad part and the data pad part provided at the protruded region of the TFT array substrate 202 may be formed to correspond to the image display part 221. Accordingly, at the corner portion where one shorter side and one longer side of the TFT array substrate 202 meet, LOG lines may be mounted to transmit gate control signals and gate driving voltages to first to N-th gate driving ICs 214A to 214N.

Input pads and output pads electrically connected to first to M-th data driving ICs 210A to 210M may be formed at first to M-th data TCPs 208A to 208M and may be electrically connected to the data PCB 212 and the data pad part of the TFT array substrate 202. In addition, gate signal transmission lines may be formed at the first data TCP 208A that are electrically connected to the LOG lines mounted on the thin film transistor array substrate 202. The gate signal transmission lines may transmit gate control signals and gate driving voltages supplied from a timing controller and a power supply unit via the data PCB 212 to the LOG lines.

The first to M-th data driving ICs 210A to 210M may convert image information, i.e., digital signals, into analog signals and may supply them to the data lines of the liquid crystal display panel 201. The first to N-th gate TCPs 214A~214N may be electrically connected to the gate pad part of the thin film transistor array substrate 202 through the output pads electrically connected to first to N-th gate driving ICs 216A to 216N.

The first to N-th gate TCPs 214A to 214N may include gate signal transmission lines connected between the LOG lines of the thin film transistor array substrate 202 and first to N-th gate driving ICs 216A to 216N. The first to N-th gate driving ICs 216A to 216N may sequentially supply scan signals, such as a gate high voltage signal (Vgh) and a gate low voltage signal, to the gate lines in response to gate control signals and gate driving voltages supplied through the LOG lines and the gate signal transmission lines.

LOG lines supply DC voltage signals, such as the gate high voltage signal (Vgh), the gate low voltage signal (Vgl), a common voltage signal (Vcom), a ground signal (GND), and a power supply voltage signal (Vdd), supplied from a power supply unit and gate control signals, such as a gate start pulse (GSP), a gate shift clock (GSC), and a gate enable signal (GOE), supplied from the timing controller. The LOG lines may be patterned at the same time when the gate lines and the gate electrodes are formed on the thin film transistor array substrate 202.

According to the present invention, in order to sequentially drive the gate lines of the image display part 221 from the last one to the first one, the first and second control signal lines CSL211 and CSL212 may be formed along with the LOG lines. The first control signal line CSL211 may be provided at the existing LOG lines and may transmit the gate start pulse (GSP) as a first control signal. That is, the first control signal line may not be additionally provided in the present invention.

Accordingly, the first control signal line CSL211 may sequentially supply the gate start pulse (GSP) to the first to N-th gate driving ICs 216A to 216N to sequentially drive the gate lines of the image display part 221 from the first one to the last one.

In addition, the second control line CSL212 may be added in the present invention to transmit the second control signal. By supplying the second control signal to the N-th gate driving IC 216N, gate lines may be sequentially driven from the last one to the first one connected to the N-th gate driving IC 216N. After the first gate line connected to the N-th gate driving IC 216N is driven, the second control signal may be supplied to the (N−1)th gate driving IC 216N-1 through the first control signal line CSL211 to sequentially drive gate lines from the last one to the first one connected to the (N−1)th gate driving IC 216N-1.

Accordingly, the second control signal may be sequentially applied to the (N−1)th, (N−2)th, . . . , the second, the first gate driving ICs (216N-1, 216N-2, . . . , 216B, 216A) through the first control signal line CSL211 to sequentially drive gate lines of the image display part 221 from the last one to the first one.

Figure 5:
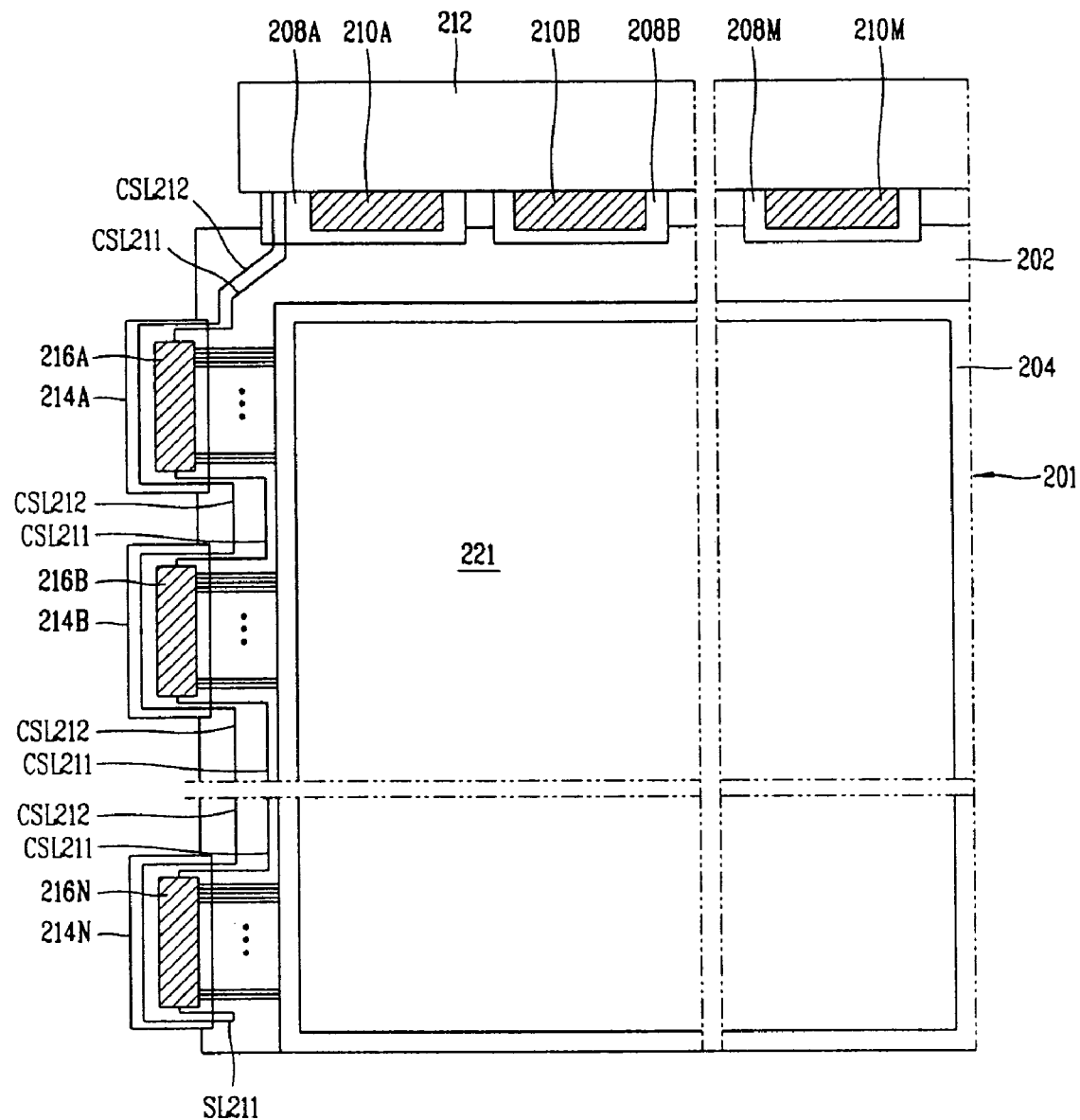
FIG. 5 is a schematic plan view of another exemplary liquid crystal display device according to the present invention.

FIG. 5 is a schematic plan view of another exemplary liquid crystal display device according to the present invention. In FIG. 5, when the N-th gate driving IC 216N has the same internal line pattern as that of the other gate driving ICs 216A to 216N-1, the second control signal line CSL212 may not be connected to the N-th gate driving IC 216N and thus the second control signal may not be supplied to the N-th gate driving IC 216N.

Thus, when the N-th gate driving IC 216N has the same internal line pattern as that of the other gate driving ICs 216A to 216N-1, a shorting line SL211 may be provided at an edge of the liquid crystal display panel 201 to electrically connect an end of the first control signal line CSL211 and an end of the second control signal line CSL212 extended from the N-th gate driving IC 216N. The shorting line SL211 may supply the second control signal supplied through the second control signal line CSL212 to the N-th gate driving IC 216N through the first control signal line CSL211, so that gate lines of the image display part 211 may be sequentially driven from the last one to the first one.

Figure 6:
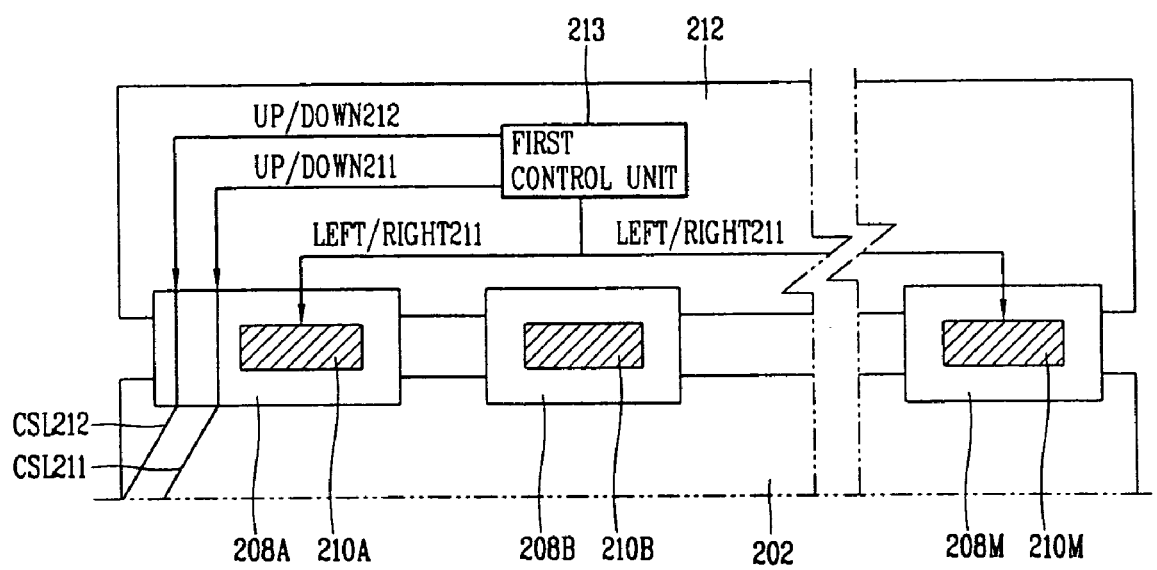
FIG. 6 is a schematic circuit diagram of an exemplary data PCB of FIGS. 4 and 5 according to the present invention.

FIG. 6 is a schematic circuit diagram of an exemplary data PCB of FIGS. 4 and 5 according to the present invention. In FIG. 6, the first controller 213 provided in a data PCB 212 may transmit first and second control signals UP/DOWN211 and UP/DOWN212 through a first data TCP 208A, in order to sequentially drive the gate lines of the image display part 211 from the first one to the last one or from the last one to the first one, to reverse an image vertically (that is, up and down).

In addition, the first controller 213 may transmit a third control signal LEFT/RIGHT 211 to the first data driving IC 210A and M-th data driving IC 210M respectively mounted at a first data TCP 208A and M-th data TCP 208M, to reverse an image of the image display part 221 horizontally (that is, right and left).

Accordingly, the liquid crystal display device of the present invention has such an advantage that an image of the liquid crystal display device may be reversed up and down even without the gate PCB by transmitting the first and second control signals generated from the first controller provided in the data PCB to the plural gate driving ICs through the first and second control signal lines mounted together with the LOG lines mounted at an outer side of the image display part of the liquid crystal display panel.

It will be apparent to those skilled in the art that various modifications and variations can be made in the liquid crystal display device of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
an image display part formed on a first substrate where data lines and gate lines are vertically and horizontally arranged, respectively, to cross each other;
a plurality of gate tape carrier packages having a gate driving integrated circuit to drive the gate lines;
a plurality of data tape carrier packages having a data driving integrated circuit to drive the data lines;
a plurality of conductive lines formed at an outer side of the image display part and on the first substrate to supply gate driving signals to the gate driving integrated circuits to be supplied to the gate lines;
a first control signal line on the gate tape carrier packages, the first control signal line being connected to the conductive lines to supply a first control signal to the gate driving integrated circuits mounted on the gate tape carrier packages so that the gate lines of the image display part may be sequentially driven from the first one to the last one by applying the first control signal to the first one through a first signal path having the conductive lines and the first control signal line on the gate tape carrier packages;
a second control signal line on the gate tape carrier packages, the second control signal line being connected to the conductive lines to supply a second control signal to the gate driving integrated circuits mounted on the gate tape carrier packages so that the gate lines of the image display part may be sequentially driven from the last one to the first one by applying the second control signal to the last one through a second signal path having the conductive lines and the second control signal line on the gate tape carrier packages; and
a first controller to supply the first and second control signals to the first and second control signal lines.

2. The device according to claim 1, wherein the first control signal line is to transmit a gate start pulse (GSP).

3. The device according to claim 1, further comprising a shorting line mounted at an edge of the first substrate to electrically connect an end of the first control signal line and an end of the second control signal line extended from the last gate driving IC.

4. The device according to claim 1, wherein the first controller is to transmit a third control signal to the first data driving IC and the last data driving IC to sequentially apply image information from the first data driving IC to the last data driving IC or from the last data driving IC to the first data driving IC.

5. A method of driving a liquid crystal display device, comprising:
providing a plurality of gate tape carrier packages having a gate driving integrated circuit for driving a plurality of gate lines;
providing a plurality of data tape carrier packages having a data driving integrated circuit for driving a plurality of data lines;
providing a plurality of conductive lines at an outer side of an image display part of a first substrate for supplying gate driving signals to the gate driving integrated circuits; and
supplying a first control signal to the gate driving integrated circuits using a first control line so that the gate lines of the image display part may be sequentially driven from the last one to the first one; and providing a shorting line at an edge of the first substrate to electrically connect an end of the first control signal line and an end of the second control signal line extended from the last gate driving IC.

6. A method of driving a liquid crystal display device, comprising:

providing a liquid crystal display device including:

an image display part formed on a first substrate where data lines and gate lines are vertically and horizontally arranged, respectively, to cross each other;

a plurality of gate tape carrier packages having a gate driving integrated circuit for driving the gate lines;

a plurality of data tape carrier packages having a data driving integrated circuit for driving the data lines;

a plurality of conductive lines mounted on an outer side of the image display part and on the first substrate for supplying gate driving signals to the gate driving integrated circuits to be supplied to the gate lines;

a first control signal line on the gate tape carrier packages, the first control signal line being connected to the conductive lines;

a second control signal line on the gate tape carrier packages, the second control signal line being together with the conductive lines;

supplying a first control signal to the first gate driving integrated circuits through a first signal path having the first control line on the gate tape carrier packages and the conductive lines so that the gate lines of the image display part may be sequentially driven from the first one to the last one; and supplying a second control signal to the last gate driving integrated circuits through a second signal path having the second control line on the gate tape carrier packages and the conductive lines so that the gate lines of the image display part may be sequentially driven from the last one to the first one.

7. The method according to claim 6, wherein an image produced by supplying the first control signal is inverted.

8. The method according to claim 6, wherein an image produced by supplying the second control signal is reversed.

9. The method according to claim 6, wherein the first control signal line transmits a gate start pulse (GSP).

10. The method according to claim 6, wherein the first controller transmits a third control signal to the first data driving IC and the last data driving IC to sequentially apply image information from the first data driving IC to the last data driving IC or from the last data driving IC to the first data driving IC.

11. A method of driving a liquid crystal display device, comprising:

providing a liquid crystal display device including:

an image display part formed on a first substrate where data lines and gate lines are vertically and horizontally arranged, respectively, to cross each other;

a plurality of gate tape carrier packages having a gate driving integrated circuit for driving the gate lines;

a plurality of data tape carrier packages having a data driving integrated circuit for driving the data lines; and a plurality of conductive lines mounted at an outer side of the image display part and on the first substrate for supplying gate driving signals to the gate driving integrated circuits;

supplying a first control signal to the gate driving integrated circuits using a first control line so that the gate lines of the image display part may be sequentially driven from the last one to the first one; and providing a shorting line at an edge of the first substrate to electrically connect an end of the first control signal line and an end of the second control signal line extended from the last gate driving IC.

* * * * *